(12) United States Patent
Sobanski

(10) Patent No.: US 12,221,895 B1
(45) Date of Patent: Feb. 11, 2025

(54) STEAM HEATED FLANGE FOR THERMAL GRADIENT CONTROL

(71) Applicant: RTX CORPORATION, Farmington, CT (US)

(72) Inventor: Jon Erik Sobanski, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/363,920

(22) Filed: Aug. 2, 2023

(51) Int. Cl.
| F01D 25/24 | (2006.01) |
| F01D 25/10 | (2006.01) |
| F01D 25/14 | (2006.01) |
| F02C 7/12 | (2006.01) |

(52) U.S. Cl.
CPC .......... *F01D 25/243* (2013.01); *F01D 25/10* (2013.01); *F01D 25/14* (2013.01); *F02C 7/12* (2013.01); *F05D 2260/2322* (2013.01)

(58) Field of Classification Search
CPC ......... F01D 25/10; F01D 25/14; F01D 25/243
See application file for complete search history.

(56) References Cited

U.S. PATENT DOCUMENTS

| 7,037,065 | B2 | 5/2006 | Reigl | |
| 8,240,988 | B2 | 8/2012 | Pang | |
| 2007/0214766 | A1* | 9/2007 | Obana | F01K 9/04 60/39.15 |
| 2012/0192567 | A1* | 8/2012 | Rice | F01D 25/14 403/34 |
| 2012/0228862 | A1 | 9/2012 | Sullivan et al. | |
| 2014/0033735 | A1* | 2/2014 | Soundiramourty | F01D 11/025 415/173.2 |
| 2015/0010389 | A1* | 1/2015 | Busekros | F01D 25/12 415/134 |
| 2017/0211474 | A1* | 7/2017 | Sennoun | F02K 3/06 |
| 2021/0207500 | A1* | 7/2021 | Klingels | F01K 23/10 |

FOREIGN PATENT DOCUMENTS

| DE | 19850470 A1 | 2/2000 |
| JP | H11350913 A | 12/1999 |

\* cited by examiner

*Primary Examiner* — Scott J Walthour
(74) *Attorney, Agent, or Firm* — Carlson, Gaskey & Olds, P.C.

(57) ABSTRACT

A turbine engine assembly includes a first case structure with a first flange and a second case structure that includes a second flange. The second flange is configured for securement to the first flange at a connection interface. At least one steam conduit is in thermal communication with the connection interface and configured to receive a portion of a flow of steam to heat the connection interface. Heating the connection interface provides for control of a thermal gradient generated by a difference in temperature in temperatures on either side of the connection interface.

19 Claims, 4 Drawing Sheets

STEAM HEATED FLANGE FOR THERMAL GRADIENT CONTROL

STATEMENT REGARDING FEDERALLY SPONSORED RESEARCH OR DEVELOPMENT

This invention was made with Government support under Contract DE-AR0001561 awarded by the United States Department of Energy, Office of ARPA-E. The Government has certain rights in this invention.

TECHNICAL FIELD

The present disclosure relates generally to an aircraft propulsion system that includes a steam generation system and utilizes steam to reduce thermal gradients at bolted flanged connections between case structures.

BACKGROUND

Reduction and/or elimination of carbon emissions generated by aircraft operation is a stated goal of aircraft manufacturers and airline operators. Steam generation and injection into the core flow can improve propulsive efficiencies. Higher operating temperatures and pressures also improve engine efficiencies. Such increases in temperatures and pressures can increases stresses on bolted flanged connections between case structures. Thermal gradients across the bolted flanged connections are generated by the extreme temperature differences between high temperature exhaust gases within the case structure and low temperature ambient conditions at the outer surface of the case structure. Increased temperatures may further challenge such bolted flanged connections and present challenges to connection performance and durability.

SUMMARY

A turbine engine assembly according to one example disclosed embodiment includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, an evaporator system that generates a flow of steam, a first case structure that includes a first flange, a second case structure that includes a second flange, the second flange is configured for securement to the first flange at a connection interface, and at least one steam conduit that is in thermal communication with the connection interface and configured to receive a portion of the flow of steam to heat the connection interface.

In a further embodiment of the foregoing turbine engine assembly, the at least one steam conduit includes a first steam conduit that is in thermal communication with the first flange and a second steam conduit that is in thermal communication with the second flange.

In a further embodiment of any of the foregoing turbine engine assemblies, the at least one steam conduit is an integral portion of at least one of the first flange and the second flange.

In a further embodiment of any of the foregoing turbine engine assemblies, each of the first flange and the second flange includes an outer peripheral surface and the at least one steam conduit is supported on the outer peripheral surface.

In a further embodiment of any of the foregoing turbine engine assemblies, the first case structure and the second case structure circumscribe portions of the combustor section and the turbine section.

In a further embodiment of any of the foregoing, the turbine engine assembly includes a first valve that controls the portion of the flow of steam that is communicated to the at least one steam conduit.

In a further embodiment of any of the foregoing, the turbine engine assembly includes a controller that is programmed to operate the first valve to control a temperature of the connection interface.

In a further embodiment of any of the foregoing, the turbine engine assembly includes at least one sensor that provides information indicative of relative temperatures between an inner surface of each of the first case structure and second the second case structure.

In a further embodiment of any of the foregoing turbine engine assemblies, the steam system includes an evaporator where thermal energy from the exhaust gas flow is utilized to generate the flow of steam and at least a portion of the flow of steam is injected into the core flow path.

In a further embodiment of any of the foregoing turbine engine assemblies, the at least one steam conduit includes an outlet for the portion of the flow of steam that is in communication with an injection location for injecting exhausted steam into the core flow path.

In a further embodiment of any of the foregoing, the turbine engine assembly includes a condenser where water is extracted from the exhaust gas flow and the evaporator is configured to receive a flow of water from the condenser.

In a further embodiment of any of the foregoing, the turbine engine assembly further includes a fuel system that is configured to provide a non-carbon-based fuel to the combustor section.

In a further embodiment of any of the foregoing, the turbine engine assembly further includes an intercooling system where a flow of water is utilized for cooling a portion of the compressed inlet flow.

An aircraft propulsion system according to another example disclosed embodiment includes, among other possible things, a core engine section that defines a core flow path where an inlet airflow is compressed, mixed with fuel and ignited to generate an exhaust gas flow that is communicated through a core flow path, a condenser where water is extracted from the exhaust gas flow, an evaporator system where thermal energy from the exhaust gas flow is utilized to generate a steam flow for injection into the core flow path, a first case structure that includes a first flange, a second case structure that includes a second flange, the second flange configured for securement to the first flange at a connection interface, and at least one steam conduit that is in thermal communication with the connection interface and configured to receive a steam flow from the evaporator system to heat the connection interface. A control valve is configured to control the flow of steam into the at least one steam conduit. A controller is programmed to operate the control valve to maintain a temperature differential of the connection interface within a defined range by adjusting a flow of steam through the at least one steam conduit.

In a further embodiment of the foregoing aircraft propulsion system, the at least one steam conduit includes a first steam conduit that is in thermal communication with a first outer peripheral surface of the first flange and a second steam conduit that is in thermal communication with the second flange.

In a further embodiment of any of the foregoing aircraft propulsion systems, the at least one steam conduit is an integral portion of at least one of the first flange and the second flange.

In a further embodiment of any of the foregoing aircraft propulsion systems, the first case structure and the second case structure circumscribe portions of the combustor section and the turbine section.

A method of operating a gas turbine engine, the method, according to another example disclosed embodiment includes, among other possible things, generating an exhaust gas flow that is communicated through a core flow path, expanding the gas flow through a turbine section to generate a mechanical power output, extracting water from the exhaust gas flow in a condenser, generating a steam flow by vaporizing the heating flow of water with heat from the exhaust gas flow in the evaporator system, and controlling a temperature of a connection interface between a first flange of a first case and a second flange of a second case by adjusting a flow of steam through at least one steam conduit that is in thermal communication with the connection interface.

In a further embodiment of the foregoing, the method further includes controlling the temperature of the connection interface to maintain a temperature differential between connection interface and an inner surface of the case structure that is exposed to the exhaust gas flow.

In a further embodiment of any of the foregoing, the method further includes exhausting the steam flow from the at least one steam conduit into the core flow path.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
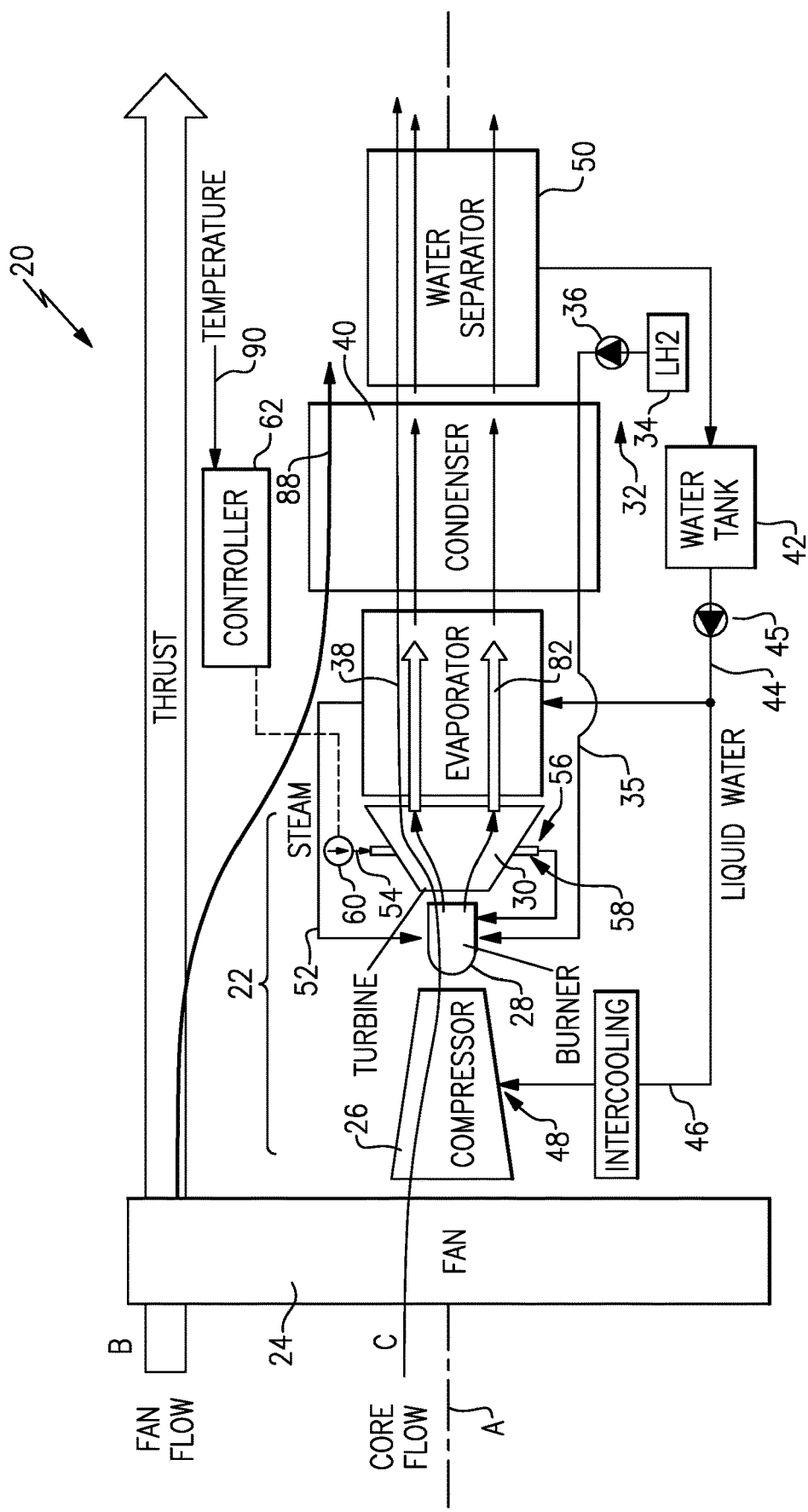
FIG. 1 is a schematic view of an example aircraft propulsion system embodiment.

FIG. 1 schematically illustrates an example propulsion system 20 that includes a steam heated flanged connection interface 58 for controlling a thermal gradient generated by the difference in temperature between hot exhaust gases and a relatively cool ambient environment. The disclosed example system reduces and controls the thermal gradient to reduce thermal stresses on the connection interface 58.

The example propulsion system 20 includes a fan section 24 and a core engine section 22. The core engine section 22 includes a compressor section 26, a combustor section 28 and the turbine section 30 disposed along an engine longitudinal axis A. The fan section 24 drives inlet airflow along a bypass flow path B, while the compressor section 26 draws air in along a core flow path C. The inlet airflow is compressed and communicated to the combustor section 28 where the compressed core airflow is mixed with a fuel flow 35 and ignited to generate the exhaust gas flow 82. The exhaust gas flow 82 expands through the turbine section 30 where energy is extracted to generate a mechanical power output utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Moreover, although the example engine 20 illustrates the engine components and sections disposed along a single common engine axis A, the engine sections and components may be arranged along multiple axes and have different relative orientations. Such alternate engine architectures are within the scope and contemplation of this disclosure. Additionally, the features of this disclosure may be applied to other engine configurations utilized to generate shaft power.

A fuel system 32 including at least a fuel tank 34 and a fuel pump 36 provides the fuel flow 35 to the combustor 28. The example fuel system 32 is configured to provide a hydrogen-based fuel such as a liquid hydrogen ($LH_2$). Although hydrogen is disclosed by way of example, other non-carbon-based fuels could be utilized and are within the contemplation of this disclosure. Moreover, the disclosed features may also be beneficial in an engine configured to operate with traditional carbon fuels and/or biofuels, such as sustainable aviation fuel.

An evaporator system 38 and condenser 40 are disposed downstream of the turbine section 30 and receive the exhaust gas flow 82. The evaporator system 38 utilizes thermal energy from the exhaust gas flow 82 to generate a steam flow 52 from a water flow 44 extracted by the condenser 40 and separated from the gas flow in a water separator 50. The condenser 40 cools the exhaust gas flow 82 to extract water that is separated from the gas in the water separator 50 and gathered in a tank 42. A pump 45 pressurizes water for communication from the water tank 42. In one disclosed example embodiment, a portion of the fuel flow 35 is utilized as a heat sink to cool the exhaust gas flow 82 in the condenser 40. In another example embodiment, a cooling ram air flow 88 is used as the cold sink. Other cold sink flows may be utilized to cool the exhaust gas flow 82 within the condenser 44 and are within the contemplation and scope of this disclosure.

Water recovered with the condenser 40 may also be provided as an intercooling water flow 46 to the compressor section 26. The water flow 46 is injected into a location 48 within the compressor section 26 to cool the core flow and thereby increase mass flow. The increased mass flow improves compressor operating efficiencies. The example intercooling water flow 48 is shown schematically and may be injected at any location within the compressor section 26 or upstream of the combustor 28.

The steam flow 52 from the evaporator 38 is injected into the core flow path C at or upstream of the combustor 28 and increases mass flow through the turbine section 30. The propulsion system 20 has an increased power output from the injected steam 52 due to an increasing mass flow through the turbine section 30 without a corresponding increase in work from the compressor section 26. Although the steam flow 52 is shown as being injected into the combustor 28, the steam flow 48 may be injected at other locations along the core flow path C and remain within the contemplation and scope of this disclosure.

Bolted flanges that connect case structures encounter large thermal gradients due to the high temperatures within the case structures and the relatively low temperatures at outer surfaces. The large thermal gradients generate a significant amount of stresses due to the differences in thermal expansions on inner and outer surfaces. Differences in thermal expansion can create prying due to circumferential thermal differences that become focused as stresses at the bolted flanged connection. The example propulsion system 20 utilizes a portion of the steam flow to reduce thermal differences by heating portions of the connection interface 58. Raising the temperature of the connection interface 58 reduces the difference in temperature and thereby the thermal gradient.

The example system routes a portion 54 of the steam flow into thermal contact with the connection interface 58. A control valve 60 is operated by a controller 62 to control a flow of the steam 54 to the connection interface 58 and maintain temperatures within a predefined range determined to limit a magnitude of the temperature gradient. The controller 62 receives information 90 indicative of a temperature and utilizes that information to control steam flow to the connection interface 58. Exhaust steam flow 56 is communicated to the combustor 28 for introduction into the core flow.

Figure 2:
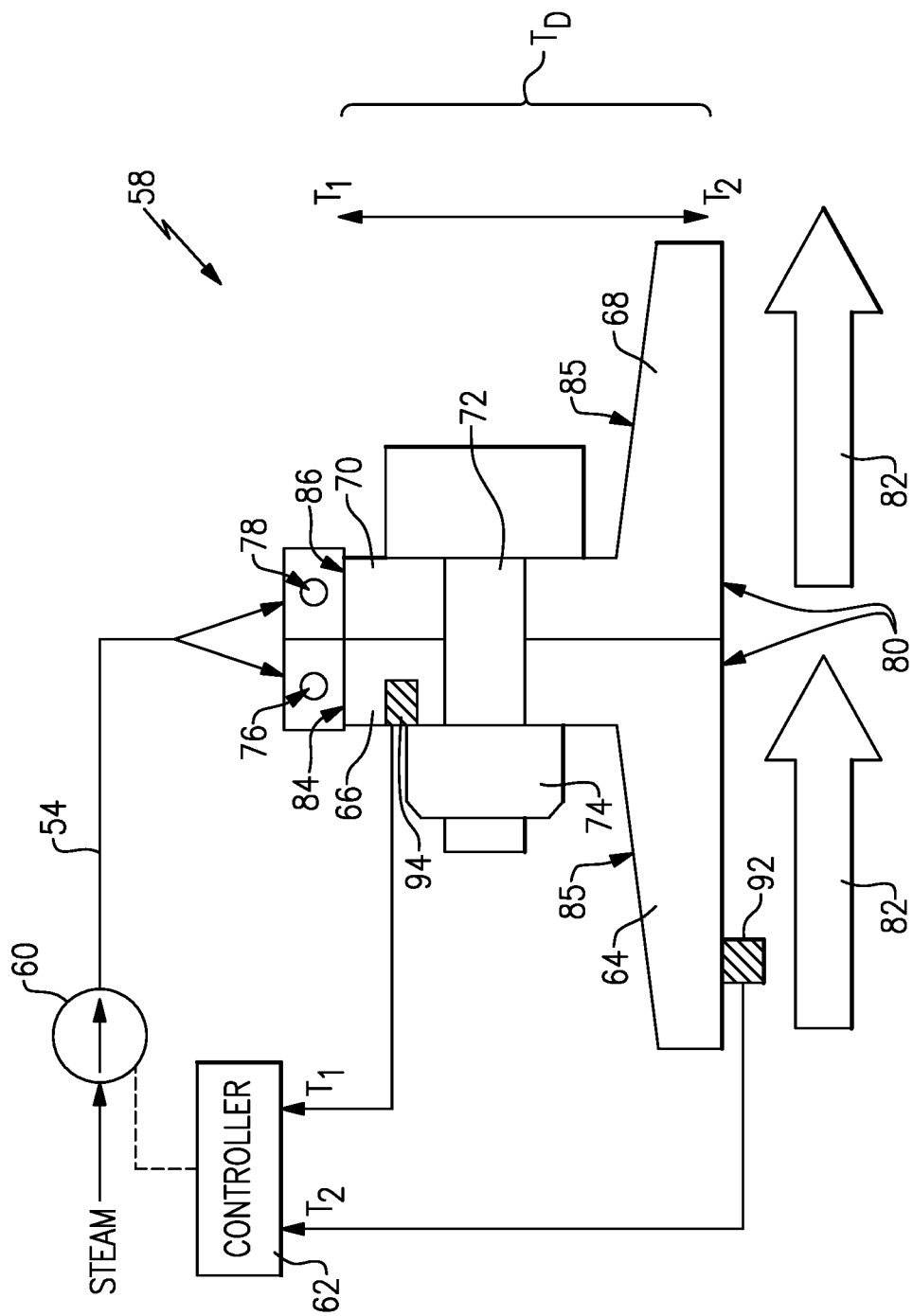
FIG. 2 is a schematic cross-sectional view of an example steam heated connection interface.

Referring to FIG. 2 with continued reference to FIG. 1, the connection interface 58 is schematically shown between a first flange 66 of a first case structure 64 and a second flange 70 of a second case structure 68. A bolt 72 and nut 74 secure the first flange 66 to the second flange 70. The bolt 72 and nut 74 may be of any configuration utilized to secure case structures together. As should be appreciated, the case structures 64, 68 are full round structures disposed about the engine longitudinal axis A. Moreover, the flanges 66, 70 include a plurality of openings for a corresponding number of bolts 72 and nuts 74 that are disposed about a circumference of the case structures 64, 68.

In one disclosed example embodiment the first case structure 64 and the second case structure 68 circumscribe portions of the combustor section 28 and the turbine section 30. The first case structure 64 may be a diffuser case disposed at least partially around the combustor section 28 and the second case structure 66 may be a turbine case that is disposed at least partially around a portion of the turbine section 30. Although specific case structures are disclosed by way of example, the example connection interface 58 may be utilized at any flanged connection between case structures of a core engine 22.

An inner surface 80 of the case structures 64, 68 is exposed to the hot exhaust gas flow 82. The inner surface 80 of the case structures 64, 68 is therefore of a temperature $T_2$ that is much higher than a temperature $T_1$ at an outer periphery 84, 86 of each of the flanges 66, 70 and an outer surface 85 of the case structures 64, 68. The temperature between $T_1$ and $T_2$ progressively cools in a direction toward the outer peripheries 84, 86.

A first steam conduit 76 and a second steam conduit 78 are provided about the outer peripheries of the first and second flanges 66, 70. Steam flow 54 through the conduits 76, 78 is in thermal communication with the coolest parts of the connection interface 58 and thereby heats the connection interface 58. Heating of the outer peripheral surfaces 84, 86 reduces the temperature difference $T_D$ to provide a reduction in thermal expansion differences that in turn reduces stress. The steam flow 54 through the connection interface 58 is exhausted as a cooled steam flow 56 that is communicated to the combustor section 28.

The first and second steam conduits 76, 78 may be separate from the flanges 66, 70 and are attached to provide the desired thermal communication of heat energy. Although first and second steam conduits 76, 78 are disclosed by way of example, a single steam conduit that is in thermal contact with the outer peripheries of each of the flanges 66, 70 may also be utilized and is within the contemplation and scope of this disclosure. Moreover, additional conduits may also be utilized and are within the scope and contemplation of this disclosure.

Moreover, although the example steam conduits 76, 78 are shown as circular in cross-section, other conduit shapes that provide for the transfer of heat energy may also be utilized and are within the contemplation of this disclosure. For example, the cross-sectional shape of the conduits 76, 78 could be oval, rectangular, square or an irregular shape. The example steam conduits 76, 78 are formed from a material determined to transfer thermal energy into the flanges 66, 70. Moreover, additional structures and materials may be included to encourage and direct thermal energy into the flanges 66, 70.

The control valve 60 is operated to adjust the steam flow 54 into the conduits 76, 78 to control the temperature $T_1$. The controller 62 adjusts the control valve 60 based on information obtained indicative of the temperature differential $T_D$. The controller 62 may obtain information that is utilized to estimate the temperatures based on specific operating conditions. The controller 62 may also obtain information from sensors 92 and 94 disposed at locations within the case structures 64, 68 and the flanges 66, 70. The sensors 92, 94 may directly measure temperatures at the specific locations or provide information that is utilized to determine or estimate temperatures.

The controller 62 is disclosed by way of example as programmed to operate the control valve 60 to adjust heating of the flanges 66, 70, the controller 62 may be programmed to operate other components to control steam flow 54 and thereby the amount of heat applied to each of the flanges 66, 70. Although a single control valve 60 is shown by way of example, additional control valves could be utilized to control steam flow individually and separately through each of the conduits 76, 78.

Moreover, the controller 62 is disclosed by way of example as adjusting operation of the valve 60 based on information from the sensors 92, 94. However, the controller 62 may also utilize information indicative of engine operation, including for example, shaft speeds, pressures and temperatures at other locations in the propulsion system 20 and information indicative of ambient conditions.

The example contoller 62 is a device and system for performing necessary computing or calculation operations and may be specially constructed for this purpose. Alternatively, the controller 62 may comprise at least a general-purpose computer selectively activated or reconfigured by a computer program stored in the computer. The controller 62 may further be a dedicated controller, or may be a program stored on an engine or aircraft controller.

The controller 62 may include a computer program directing operation. Such a computer program and also data required for its execution may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Furthermore, the computer referred to nay include a single processor or may be architectures employing multiple processor designs for increased computing capability.

Figure 3:
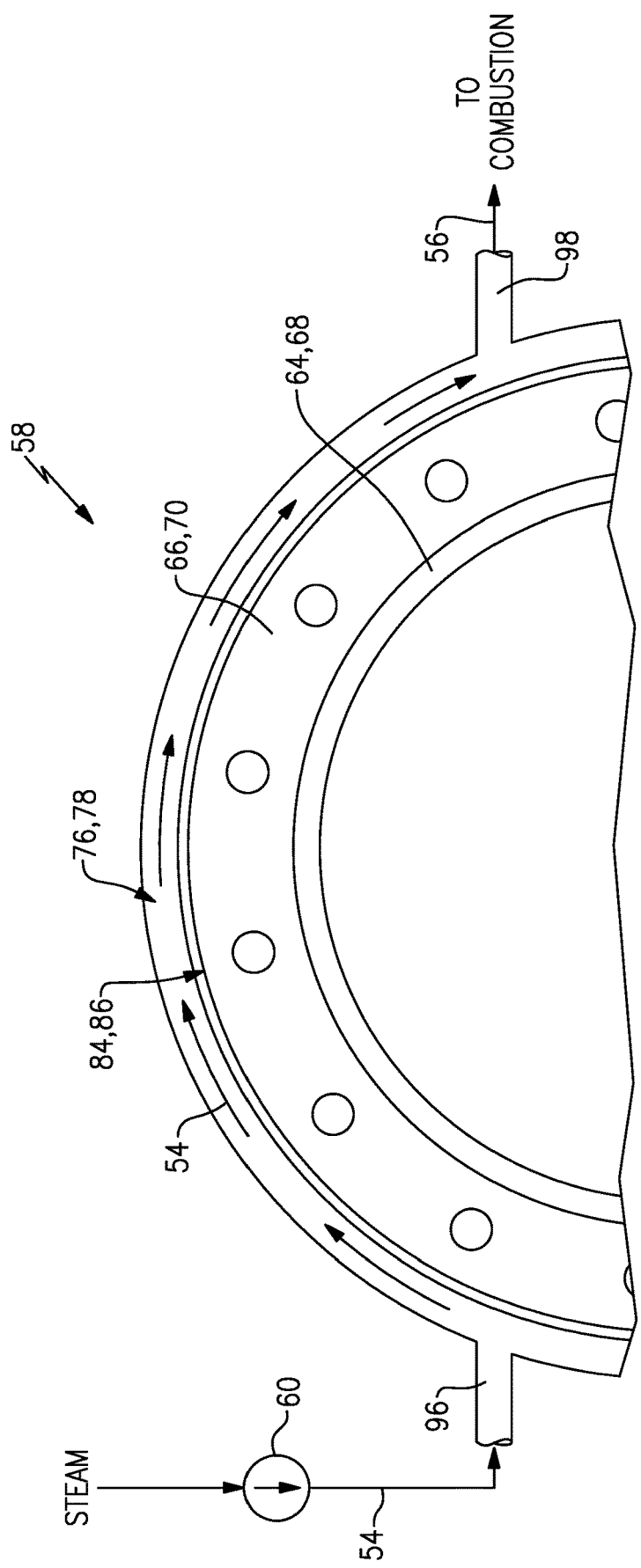
FIG. 3 is a schematic axial view of the example steam heated connection interface.

Referring to FIG. 3 with continued reference to FIG. 2, a partial axial view of the example connection interface 58 is shown with the steam conduits 76, 78 disposed on the outer peripheral surfaces 84, 86 of each of the flanges 66, 70. In this example embodiment, the conduits 76, 78 are arranged to provide a circumferentially directed flow. The steam flow 54 cools as it heats the flanges 66, 70 and is exhausted through an outlet 98 as a cooled steam flow 56. Although a single inlet 96 and a single outlet 98 are shown and disclosed by example, additional inlets and outlets could be provided about the circumference of the connection interface to provide a flow of uniform temperature.

Figure 4:
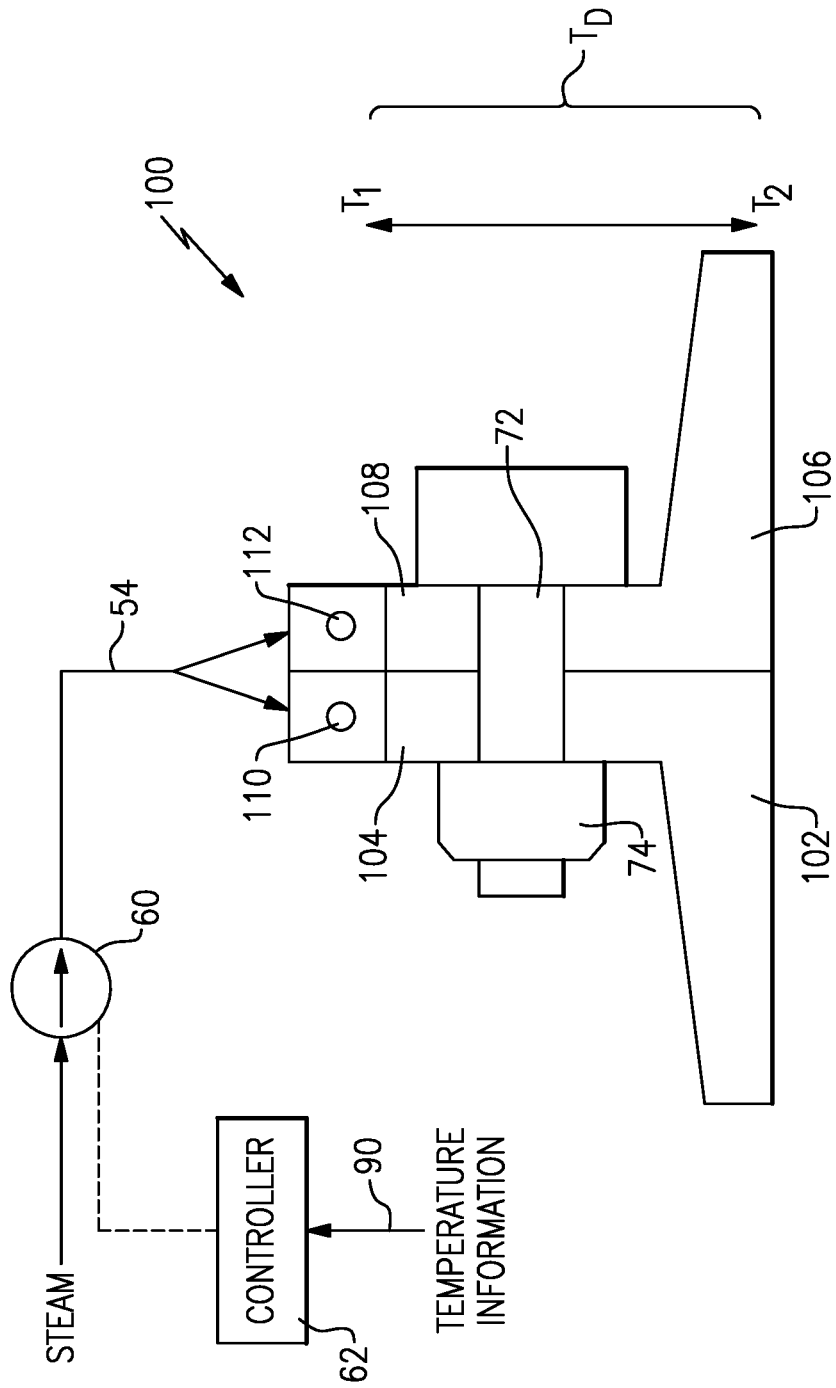
FIG. 4 is a schematic cross-sectional view of another example steam heated connection interface.

Referring to FIG. 4, another example connection interface 100 is schematically shown and includes a first case 102 with a first flange 104 and a second case 106 with a second flange 108. A first conduit 110 is integrated within the first flange 104 and a second conduit 112 is integrated within the second flange 108. The integrated conduits 110, 112 provide an alternate means of heating that may simplify constructions. Steam flow 54 is communicated to the integral conduits 110, 112 to provide for the control of the temperature differential $T_D$ and thereby a reduction in the amount of stress generated. The controller 62 adjusts the control valve 60 to provides the steam flow 54 based on temperature information 90.

The conduits 110 and 112 are shown as circular in cross-section, but may be of any shape. Moreover, although one conduit 110, 112 is shown in each flange 104, 108, other numbers of conduits could be utilized and remain within the contemplation and scope of this disclosure.

Accordingly, example disclosed systems use thermal energy from steam generated for injection into the core flow to reduce and control the thermal gradient within a bolted flange connection interface to improve performance and durability.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
a compressor section where an inlet airflow is compressed;
a combustor section where the compressed inlet airflow is mixed with fuel and ignited to generate an exhaust gas flow that is communicated through a core flow path defined along an engine longitudinal axis;
a turbine section through which the exhaust gas flow expands to generate a mechanical power output;
an evaporator system generating a flow of steam; a first case structure including a first flange, wherein the first flange is a full round structure that is disposed transverse to and about the engine longitudinal axis;
a second case structure including a second flange, wherein the second flange is a full round structure that is disposed transverse to and about the engine longitudinal axis, the second flange configured for securement to the first flange at a connection interface; and
at least one steam conduit in thermal communication with the connection interface and connected to the evaporator system to receive a portion of the flow of steam to heat the connection interface, wherein the first flange includes a first outer peripheral surface and the second flange includes a second outer peripheral surface, each of the first outer peripheral surface and the second outer peripheral surface transverse to the engine longitudinal axis, wherein the at least one steam conduit is supported on and extends along a respective one of the first outer peripheral surface or the second outer peripheral surface.

2. The turbine engine assembly as recited in claim 1, wherein the at least one steam conduit includes a first steam conduit in thermal communication with the first flange and a second steam conduit in thermal communication with the second flange.

3. The turbine engine assembly as recited in claim 1, wherein the at least one steam conduit is an integral portion of at least one of the first flange and the second flange.

4. The turbine engine assembly as recited in claim 1, wherein the first case structure and the second case structure circumscribe portions of the combustor section and the turbine section.

5. The turbine engine assembly as recited in claim 1, including a first valve controlling the portion of the flow of steam communicated to the at least one steam conduit.

6. The turbine engine assembly as recited in claim 5, including a controller programmed to operate the first valve to control a temperature of the connection interface.

7. The turbine engine assembly as recited in claim 6, including at least one sensor providing information indicative of relative temperatures between an inner surface of each of the first case structure and second the second case structure.

8. The turbine engine assembly as recited in claim 1, wherein thermal energy from the exhaust gas flow is utilized to generate the flow of steam in the evaporator system and at least a portion of the flow of steam is injected into the core flow path.

9. The turbine engine assembly as recited in claim 8, wherein the at least one steam conduit includes an outlet for the portion of the flow of steam that is in communication with an injection location for injecting exhausted steam into the core flow path.

10. The turbine engine assembly as recited in claim 8, including a condenser where water is extracted from the exhaust gas flow and the evaporator system is configured to receive a flow of water from the condenser.

11. The turbine engine assembly as recited in claim 1, further including a fuel system configured to provide a non-carbon-based fuel to the combustor section.

12. The turbine engine assembly as recited in claim 1, further including an intercooling system where a flow of water is utilized for cooling a portion of the compressed inlet flow.

13. An aircraft propulsion system comprising:
a core engine section comprising a compressor section where an inlet airflow is compressed, a combustor section where the compressed inlet airflow is mixed with fuel and ignited to generate an exhaust gas flow that is communicated through a core flow path defined along an engine longitudinal axis, and a turbine section through which the exhaust gas flow expands to generate a mechanical power output;

a condenser where water is extracted from the exhaust gas flow;

an evaporator system where thermal energy from the exhaust gas flow is utilized to generate a steam flow for injection into the core flow path;

a first case structure including a first flange, wherein the first flange is a full round structure that is disposed transverse to and about the engine longitudinal axis and wherein the first flange includes a first outer peripheral surface transverse to the engine longitudinal axis;

a second case structure including a second flange, wherein the second flange is a full round structure that is disposed transverse to and about the engine longitudinal axis, the second flange configured for securement to the first flange at a connection interface, and wherein the second flange includes a second outer peripheral surface transverse to the engine longitudinal axis; and at least one steam conduit in thermal communication with ac the connection interface and connected to the evaporator system to receive a steam flow from the evaporator system to heat the connection interface, wherein the at least one steam conduit is supported on and extends along a respective one of the first outer peripheral surface or the second outer peripheral surface;

a control valve configured to control the flow of steam into the at least one steam conduit; and a controller programmed to operate the control valve to maintain a temperature differential of the connection interface within a defined range by adjusting the flow of steam through the at least one steam conduit.

14. The aircraft propulsion system as recited in claim 13, wherein the at least one steam conduit includes a first steam conduit in thermal communication with the first flange and a second steam conduit in thermal communication with the second flange.

15. The aircraft propulsion system as recited in claim 13, wherein the at least one steam conduit is an integral portion of at least one of the first flange and the second flange.

16. The aircraft propulsion system as recited in claim 5, wherein the first case structure and the second case structure circumscribe portions of the combustor section and the turbine section.

17. The turbine engine assembly as recited in claim 1, wherein the at least one steam conduit is arranged to provide a circumferentially directed flow transverse to the engine longitudinal axis.

18. The turbine engine assembly as recited in claim 1, wherein the at least one steam conduit further comprises an outlet where steam flow is exhausted and directed to the combustor section.

19. The turbine engine assembly as recited in claim 1, wherein each of the first flange and the second flange includes a respective through hole for a fastener to secure the first flange to the second flange and the at least one steam conduit is disposed radially outward of the respective through hole and the respective fastener.

* * * * *